March 2, 1965 H. J. PEAKE 3,172,096

METHOD AND APPARATUS FOR DATA CONVERSION

Filed March 10, 1961 2 Sheets-Sheet 1

INVENTOR

HAROLD J. PEAKE

BY G. D. O'Brien

Richard J. Keegan

ATTORNEYS

METHOD AND APPARATUS FOR DATA CONVERSION

Filed March 10, 1961 2 Sheets-Sheet 2

INVENTOR

HAROLD J. PEAKE

BY *[signature]*

*Richard J. Keegan*

ATTORNEYS 3,172,096
Patented Mar. 2, 1965

3,172,096
METHOD AND APPARATUS FOR DATA CONVERSION

Harold J. Peake, 945 Swarthmore Drive, Alexandria, Va.

Filed Mar. 10, 1961, Ser. No. 94,950
1 Claim. (Cl. 340—347)
(Granted under Title 35, U.S. Code (1952), sec. 266)

The invention described herein may be manufactured and used by or for the Government of the United States of America for governmental purposes without the payment of royalties thereon or therefor.

This invention relates to information processing and more particularly to an improved method and apparatus for the transformation of data from its recorded form to a form more readily transmissible under adverse communication conditions and for the reconversion of such information to its original form.

In the field of space technology many scientific limitations, that are considered in less exotic arts to be mere inconveniences or expensive impediments, present themselves as almost insurmountable difficulties due to the severe weight limitations and the extreme environmental conditions which are prevalent in this field of scientific exploration. In more conventional areas of development relatively simple solutions may be found to what appear to be simple problems by virtue of the fact that, within the realm of the reasonable, little or no restriction is placed upon size and, in the electronic field, power limitations are dictated by relatively flexible economic considerations.

One problem which has presented major difficulties in the field of space vehticles and satellite applications is that of maintaining a communications link between a relatively small space vehicle, having extremely limited power capabilities, and earth-bound communication centers. In order that maximum utilization may be obtained from an orbiting vehicle it is required that many informational items be transmitted from that vehicle to tracking stations on the earth so that a useful output may be derived from the scientific equipment contained therein. In the accomplishment of particular scientific experiments it is often required that a plurality of measurements be made simultaneously and the results thereof be transmitted over a communications link of limited capacity. In the case of a deep space probe, such as a solar orbiting vehicle, the transmisison range may approach hundreds of millions of miles with a nearly incomprehensible increase in the difficulty of transmission when compared with conventional telemetering methods.

It is well known that the capacity of a communications link is a function of the band width and the signal-to-noise ratio of the signal transmitted thereover. This relationship is expressed in the Hartley-Shannon law with C, the channel capacity, equal to $$W \log_2 \left(1+\frac{S}{N}\right)$$

where W is the band width in cycles and the quantity $$\frac{S}{N}$$

is the signal-to-noise ratio. If a communication facility, or system, is in use for T seconds, the number of bits transmitted, B, may be determined by multiplying C from the above equation by the time of transmission. Now, by investigating this relationship it will be realized that the amount of information that can be transmitted may be increased by increasing T, namely, the length of time the facility is used; or by increasing the band width of the system; or by improving the signal-to-noise ratio. As a matter of practicality, the size of the band width is limited due to the already crowded radio frequency spectrum. The signal-to-noise ratio may be improved by the utilization of an extremely sensitive receiver or by increasing the power of the transmitter. The sensitivity of the receiver is generally limited to that of the best presently existing device, while the transmission power that may be employed in a satellite or space vehicle is severely restricted by the weight that may be allocated to a battery power supply or to the amount of energy that may be generated by some auxiliary method such as, for example, solar cells. Power limitation is particularly difficult to overcome when it is considered that, assuming the signal power may be increased without increasing noise, the gain in B is quite modest, since $$\frac{S}{N}$$

is involved, not directly, but as its logarithm.

In view of the principles stated, it can be seen that the most profitable way to increase the capacity of a communications link having limited power and operating over extreme distances is to increase the time during which a given amount of intelligence is to be transmitted. This is a particularly appropriate approach in the space field inasmuch as it is quite customary to make a plurality of measurements at spaced time intervals, the results of which are stored and then transmitted in response to a command signal from the receiving station. However, one major problem is that many scientific investigations require that a number of measurements be performed simultaneously so as to provide enough useful information for proper experimental evaluation. It is preferred therefore, when a plurality of measurements are taken at a given time instant, that these measurements, or the digital or analogue electrical signals representing these measurements, be spaced out in time so that a limited amount of intelligence is transmitted at any given instant. The communications channel may then be utilized for a longer transmission period than the time required to make the particular measurements. Thus, a small capacity channel can be utilized to transmit relatively large amounts of information over an extended time interval.

With the above considerations in mind, it would be highly desirable if a method were available to convert a plurality of simultaneously obtained informational bits to a serial form wherein each of the individual bits would be time displaced relative to all other such simultaneously obtained bits. Conventional conversion devices such as storage matrices, readout circuitry and other complex computer equipments are unsatisfactory due to the size, weight, temperature, reliability and other constraints and limitations peculiar to space exploration and technology.

Accordingly it is an object of the present invention to provide an improved method for information conversion adaptable to space vehicle use.

Another object of the present invention is to provide improved instrumentation means for converting information from parallel plural channel form to serial single channel form and the later reconversion of the same to its original form.

A further object is to provide an improved information conversion device having greatly simplified and compact construction and possessing increased reliability.

Yet another object is to provide a data conversion device suitable for the transposition of data into a form for transmission over long distances with minimal transmitter power.

A still further object is to provide a method of converting plural channel information to single channel time distributed form for transmission over a communications link having a limited capacity and for reconverting such information to its original form after its reception at a terminal station.

Other objects of this invention will become apparent upon a more comprehensive understanding of the invention for which reference is had to the following specification and drawings wherein.

Figure 1:
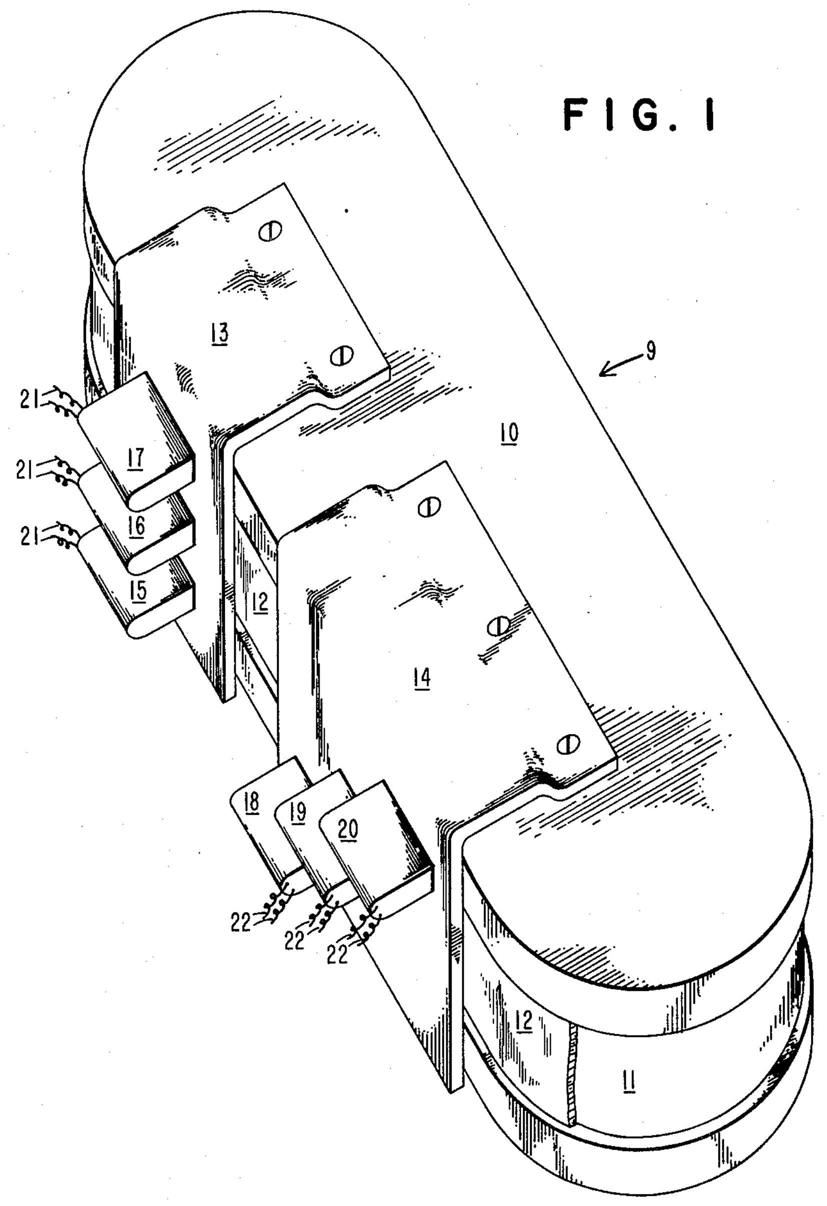
FIG. 1 is a simplified perspective view of one embodiment of the instant invention as applied to a tape recording device and showing a suitable arrangement of recording and pickup transducers.

Referring now to the drawings wherein like reference numerals designate identical or corresponding parts throughout the several views, and more particularly to FIG. 1, there is shown one embodiment of the present invention comprising an informational storage device indicated generally at 9 as a tape recording unit. The recorder 9 is provided with a groove 12 adapted to contain a suitable magnetic tape or other storage medium. The tape 11 is drawn along groove 12 in a conventional manner by electric motors or other power drive means, not shown. Brackets 13 and 14, carried on recorder housing 10, support a plurality of transducers or heads which perform the information storing and removal function on magnetic tape 11, as will be described. Bracket 13 is illustrated as supporting recording transducers 15, 16 and 17 which extend through the brackets in such a manner that an electrical signal, representative of an informational item, will be recorded in conventional fashion on the tape 11 as it passes beneath bracket 13. It should be realized that for purposes of illustration only, the instant embodiment is shown as a three channel device. However the invention is not so limited and may include any number of channels depending on the number of simultaneous informational items to be transmitted and, in the illustrated embodiment, the tape width.

The second bracket 14 supports a like number of transducers which are capable of removing information from magnetic tape 11. These pickup transducers 18, 19 and 20, supported by bracket 14, are positioned so that information recorded on tape 11 by transducer 15 will be removed by transducer 18, and similarly, information recorded by transducers 16 and 17 will be removed by transducers 19 and 20, respectively. However, in contradistinction to the input or record transducers, which are linearly aligned in a direction perpendicular to the direction of tape movement, the pickup transducers are linearly displaced relative to each other and to the direction of tape movement by an amount that will be discussed in detail hereinafter.

Each of the several record or input transducers may be provided with a pair of electrical connection leads 21 which are connected to signal generating means, not shown, for purposes of inserting information into the recording device. Similar leads 22 on the pickup transducers may be connected to the space vehicle transmitter as desired.

Figure 2:
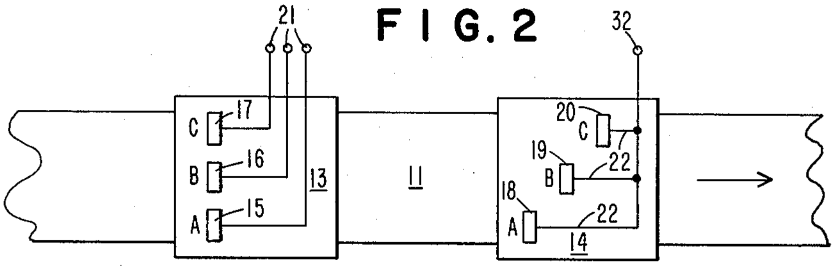
FIG. 2 is a simplified diagrammatic showing of the transducers or heads of a tape recording unit illustrating a principle of the present invention.

Referring now to FIG. 2 there is diagrammatically illustrated one spatial arrangement of the input and output transducers suitable for practice of the instant inventaion on a three channel recorder.

Figure 3:
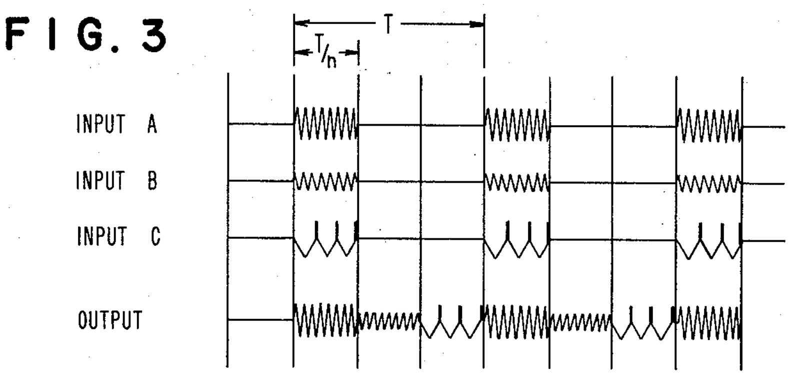
FIG. 3 is a graphical representation of the signals that are present in the input and output circuits of a device incorporating the instant invention.

It will be observed that the three input or record transducers 15, 16 and 17 are positioned so that when the tape 11 moves from left to right, as illustrated, three input signals may be simultaneously recorded on the tape in a parallel manner corresponding to channels A, B and C of FIGURE 3. It is important to this embodiment of the invention that the recorded information be of a known duration or else require less than a determinable period of time, as will become evident as the description proceeds. The pickup transducers, positioned along the path of the moving tape so that each transducer will pick up a discrete informational channel, are linearly displaced relative to each other in the direction of tape movement so that the separation distance between individual pickup transducers will be at least equal to the linear amount of tape required to record the input signals. The outputs of each of the pickup transducers 18, 19 and 20 are connected to a common output lead 32 which may then be connected to a transmission device, not shown.

As previously noted, many space experiments require that a plurality of simultaneously measured parameters be transmitted to a receiving station over a communication link having limited capacity. One such example is measurement of the upper atmosphere ozone content. Such an experiment requires the transmission of three simultaneously recorded informational items, namely, a measurement of the ultraviolet radiation which is indicative of ozone content, the measurement of the absolute temperature, which is required for calibration purposes and the measurement of vehicle aspect relative to the sun. According to the present invention, signals representing these three simultaneously measured quantities are inserted on tape 11 through input transducers 15, 16 and 17 and are recorded thereon in simultaneous parallel fashion. As the magnetic tape passes under the pickup transducers the A channel, which was inserted through input transducer 15, will be reproduced through the A channel pickup transducer 18. At a later time the information inserted on the tape by the B channel input transducer 16 will be reproduced by the B pickup transducer 19 and at a still later time the C channel information will be likewise reproduced from tape 11 by transducer 20. As emphasized hereinbefore the pickup transducers are linearly separated by an amount at least as great as the length of tape required to record the individual bits of intelligence. Therefore, all of the information recorded on A channel will be reproduced by transducer 18 prior to the initial portion of the information recorded on B channel arriving at pickup transducer 19. A similar condition exists relative to C channel so that when the three output transducers are connected together at a single terminal point 32 the output will consist of a series of single channel items displaced in time one from another in lieu of the simultaneously recorded parallel input.

FIG. 3 is a graphical representation of the time relationship existing between information recorded on the various channels of the embodiment illustrated in FIGS. 1 and 2 and the output signal. It will be observed that to achieve the conversion described, and for an informational sampling rate of T, the duration of each informational item must be not greater than $T/n$, where $n$ is the number of channels to be transmitted. It will also be noted that for a repetition rate of T, maximum utilization of the communications channel will be obtained when the duration of the parameter being measured is exactly $T/n$.

As explained previously, the embodiment described comprehends the utilization of any number of channels, as may be required for a particular application. Further, it should be noted the invention contemplates that the spacing of the pickup transducers need not be permanently fixed at any position but rather may be adjusted to most efficiently accommodate input signals of varying duration.

Figure 4:
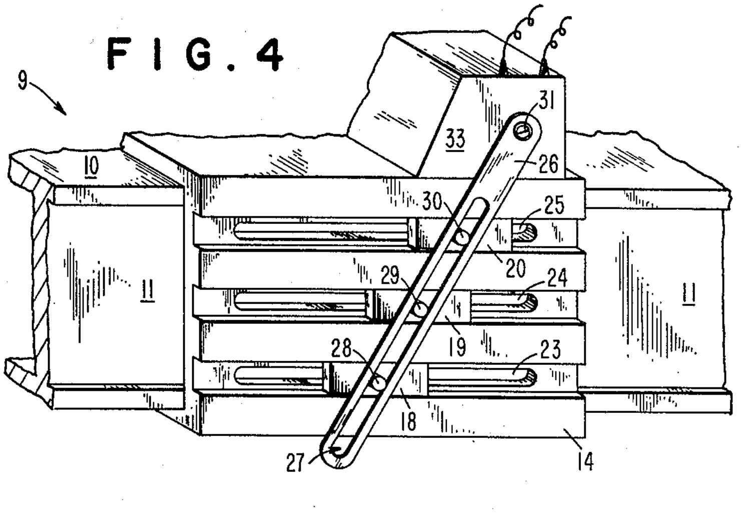
FIG. 4 is a fragmented perspective view of another arrangement of the pickup transducers of a tape recording unit in accordance with the invention.

One means of accomplishing such an adjustment is illustrated in FIG. 4 wherein output transducer mounting bracket 14 has machined on its outer surface a plurality of slots 23, 24 and 25, adapted to receive, respectively, the output transducers 18, 19 and 20. These transducers may be slideably mounted in said slots so that their position relative to each other may be adjusted as is desired. A control arm 26 is provided with an opening 27 adapted to contain therein studs 28, 29 and 30 attached to transducers 18, 19 and 20 respectively. Control arm 26 is mounted on shaft 31 extending from control means 33 which may be a stepping switch or other conventional means of accomplishing a measured angular rotation of control arm 26 about the shaft. As control arm 26 rotates, the opening 27, in cooperation with studs 28, 29 and 30, causes transducers 18, 19 and 20 to be slideably displaced relative to each other in the direction of slots 23, 24 and 25. Thus, it will be observed that, when it is desired to transform information from a number of diverse experiments requiring informational items of varying time duration, the spacing of the pickup transducer heads may be adjusted to accomplish such transformation in a most efficient manner. By means of the embodiment of FIG. 4 therefore, as the satellite programs itself for various experiments, or on command, a signal may cause control unit 33 to adopt any of a number of preset positions appropriate for the experiment being performed.

While for purposes of illustration the present invention has been described for use in conjunction with a space vehicle and its attendant communications link of limited capacity, it should be understood that many anologous areas will be found where it is desirable to transmit in serial time displaced form a plurality of simultaneously obtained informational items, and where the instant invention will find useful adaption.

In describing the invention reference has been made to a tape recording device. Obviously wire recording devices, disc recorders and other known storage expedients could be modified in accordance with the principle disclosed herein. In addition, although the invention has been described in a most useful application permitting transposition of parallel information to serial data, other applications are considered within the province of the invention.

One such application would be the interchange of the recording and pickup or readout functions to permit, with minor modifications, a conversion from serial to parallel data. The simplest and most direct method of performing such an operation is to insert serial time displaced information at transducer heads 18, 19 and 20, drive the tape in the reverse direction and reproduce the converted information at transducer heads 15, 16 and 17. When using this basic operational method it will be required that the operator select the portion of the output signal desired so that repeated information will be rejected. It should, of course, be understood that by using simple methods, well known in the data handling art, such selection process would be performed either mechanically or electronically.

Another modification contemplates spacing the pickup head from its associated recording head at a distance greater than the tape speed multiplied by the input pulse duration. Such arrangement would, for information in the form of D.-C. binary pulses, convert parallel information to serial return-to-zero information, while for transducer spacings equal to tape speed times input pulse duration, serial non-return-to-zero data is produced.

Obviously numerous modifications and variations of the present invention are possible in the light of the above teachings. It is therefore to be understood that within the scope of the appended claim the invention may be practiced otherwise than as specifically described herein.

What is claimed is:

A data conversion system for converting informational items which are simultaneously and periodically present in each channel of a multichannel system having *n* channels into informational items which are time distributed serially in a single channel system wherein the time T between successive informational items present in each channel of said multichannel system is at least as great as the sum of the times occupied by the informational items present in all channels of the multichannel system during said time T, and wherein each channel has different and distinct informational items present therein comprising: a multichannel recorder including a recording medium capable of simultaneously recording *n* channels of information; *n* recording means connected to the multichannel system for recording on the recording medium of said multichannel recorder all the informational items in the multichannel system, said recording means being linearly aligned perpendicular to the direction of movement of the recording medium of the multichannel recorder; *n* reproducing means for reproducing said informational items recorded on the recording medium, said reproducing means being linearly aligned and displaced from one another in the direction of movement of the recording medium of the multichannel recorder, said displacement between each of said reproducing means being at least as great as the length of an informational item on the recording medium of the respective recording channel and the sum of said displacements of all said reproducing means being no greater than the length of the recording medium required to record for said time T; and means for combining the outputs from said reproducing means, whereby the output from said last mentioned means is a single channel signal that is a serial combination of all said informational items from all of said channels.

References Cited by the Examiner

UNITED STATES PATENTS

| | | | |
|---|---|---|---|
| 2,800,639 | 7/57 | Lee | 340—15 |
| 2,916,724 | 12/59 | Peterson | 340—15 |

MALCOLM A. MORRIS, *Primary Examiner.*

STEPHEN W. CAPELLI, *Examiner.*